United States Patent

[11] 3,576,129

| [72] | Inventor | Nelson A. Crites |
| | | Columbus, Ohio |
| [21] | Appl. No. | 854,354 |
| [22] | Filed | Aug. 19, 1969 |
| [45] | Patented | Apr. 27, 1971 |
| [73] | Assignee | Abbott Laboratories |
| | | Chicago, Ill. |

[54] CLINICAL DISPOSABLE THERMOMETER
5 Claims, 8 Drawing Figs.

[52] U.S. Cl. .................................................. 73/358,
116/114.5, 350/114, 350/160
[51] Int. Cl. ........................................................ G01k 11/06
[50] Field of Search .......................................... 73/356,
358; 116/114.5, 114.20; 350/114, 160 (P)

[56] References Cited
UNITED STATES PATENTS
3,002,385   10/1961   Wahl et al. ..................... 73/358X
3,175,401   3/1965   Geldmacher ..................... 73/358
3,465,590   9/1969   Kluth et al. ..................... 73/358X

*Primary Examiner*—Louis R. Prince
*Assistant Examiner*—Frederick Shoon
*Attorney*—Robert L. Niblack ABSTRACT: A disposable thermometer has an indicia of temperature spaced apart from a magnifying lens lying within the focal length of the lens. A temperature-responsive opaque material is positioned on the inner lens surface, that is, the one facing the indicia of temperature. When in the solid phase, the temperature-responsive material acts as a shutter to obscure a legible view of the indicia through the magnifying lens. When the temperature rises to a predetermined level, the temperature-responsive material melts, becomes transparent, and spreads as a thin film or layer on the inner lens surface thus rendering visible a magnified or enlarged virtual image of the indicia of temperature.

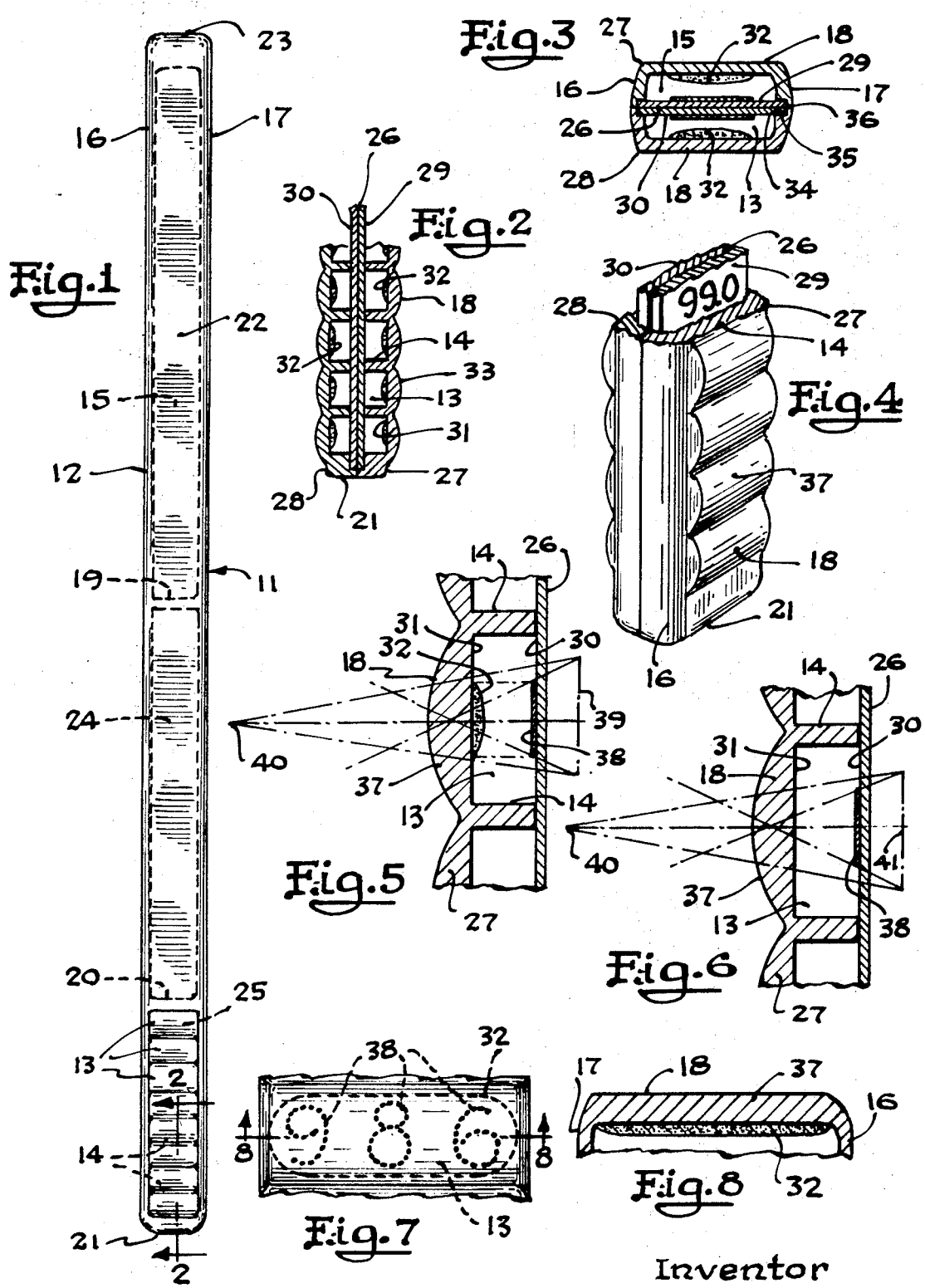

CLINICAL DISPOSABLE THERMOMETER

This invention relates to temperature measurement. More particularly, this invention relates to disposable thermometers, and especially to thermometers suitable for measuring the temperature of the human body.

When diagnosing a patient's complaint, a measurement of body temperature is routinely taken to detect any deviation from the normal temperature range that may aid in the diagnosis. Similarly, the temperature of hospitalized patients is regularly taken and recorded to chart their condition and also to indicate their response to medication.

The presently used mercury capillary thermometers are far too expensive to justify their disposal after a single use. Yet, being used repeatedly, they introduce the necessity of sterilization after use to prevent communication of disease between patients. In addition to the problems of cleanliness, they are difficult to read and can easily be broken. Furthermore, being relatively expensive, they introduce problems of inventory control.

The primary purpose of this invention then is to provide an inexpensive disposable thermometer that can be individually packaged free from contamination, that is accurate, easily read, and suitable either for oral or rectal use.

In certain of its broader aspects, the new thermometer of this invention comprises a probe of a shape suitable for a least partial insertion of its proximal portion into a body cavity in the same manner as the presently used mercury capillary thermometers. At the distal portion of the probe is a handle means for manipulating it into a proper position for temperature measurement, and for holding it during removal and reading. At the proximal portion of the probe is a plurality of cells that house temperature-responsive material that shall be completely described later. The temperature-responsive material in any particular cell has a known and predetermined melting point and is chosen to undergo a phase change from solid to liquid sharply at the desired temperature.

Those devices available in the prior art that depend on the phase change of a material to measure bodily temperature have in practice been difficult to use. They either are too bulky for comfortable insertion into the body cavity of choice, or are difficult to read once a temperature has been taken leading to inaccurate readings.

One problem in developing a disposable thermometer for oral or rectal use is that the available space for each cell is limited. Each cell only registers a small portion, for example, 0.5°—1.0° F., of the entire range of temperature desired, usually 96°—106°F. A plurality of cells is therefore required if a discrete temperature is to be measured. Thus, upwards of 10 to 20 cells must be located in a length of about three-fourths inch. If the temperature-measuring portion of the probe is to properly fit under the tongue for example, it follows that each cell must be rather small.

Unfortunately, if the cells are sufficiently numerous to provide the desired accuracy and sufficiently small to meet the space requirements; the phase change of the temperature-responsive material is difficult to detect.

The present invention overcomes this difficulty by providing each cell with a magnifying lens. Some indicia of temperature, for example numerals, is spaced apart from the magnifying lens and is within the focal length of the lens. A small amount of temperature-responsive material, just sufficient to obscure the indicia of temperature is disposed on that surface of the magnifying lens facing the indicia of temperature. In the solid phase the translucent or opaque temperature-responsive material acts as a shutter to render the view of the indicia through the lens illegible. But when the temperature rises to a predetermined level, the temperature-responsive material melts and because it is transparent in the liquid phase, renders the now-magnified upright virtual image of the indicia of temperature legible. The temperature-responsive material is applied to the lens surface so as to cover an area substantially equivalent to the actual area occupied by the indicia of temperature. Thus, less area of the lens surface is covered than is the apparent area occupied by the virtual image of the indicia. This is important in two respects. First, because less temperature-responsive material is required than otherwise and certainly less than would be used to cover the entire lens surface, or cell, the response time for the phase change from solid to liquid is decreased. Second, since less material is used, the melted temperature-responsive material spreads upon the lens surface as a wetting film thus obviating the problem of having the melted temperature-responsive material form a meniscus within the cell. If a meniscus forms not only is the virtual image distorted, but an air bubble can form in the melted material rendering the reading illegible. Such conditions can lead to serious errors in reading temperatures, and are eliminated by the thermometer of this invention.

Additional objects, advantages and functions of this invention will become apparent upon reference to this specification and to the attached drawing illustrating the preferred embodiment of this invention, in which like elements are identified by like reference numerals in each of the views, and in which:

FIG. 1 is a top plan view of the thermometer of this invention having a plurality of cells at the proximal end thereof;

FIG. 2 is a longitudinal cross-sectional view through the cells of FIG. 1 along 2—2;

FIG. 3 is a lateral cross-sectional view through a cell as shown in FIG. 1;

FIG. 4 is an isometric view of the distal portion of the thermometer shown in FIG. 1 illustrating the placement of the indicia of temperature;

FIG. 5 is a larger scale view of a single cell shown in FIG. 2 illustrating the optics of the combination;

FIG. 6 is a view similar to FIG. 5, but after the temperature-responsive material disposed on the inner surface of the magnifying lens has liquified;

FIG. 7 illustrates the temperature-responsive material overlaying the indicia of temperature; and FIG. 8 is a view along 8—8 of FIG. 7 showing the temperature-responsive material disposed on the inner surface of the magnifying lens.

Referring to the drawings and particularly FIG. 1, there is shown thermometer 11 that comprises a housing 12 having a proximal end 21 and a distal end 23 with reference to the person whose temperature is being measured.

For clarity, thermometer 11 is shown in FIG. 1 approximately two times the size of the preferred embodiment. In other figures, the views are likewise enlarged. In use, the size of the thermometer is of course dictated by the necessity for comfortable insertion into body openings, for instance into the mouths, both adults and small children or the rectums of infants, together with the need for legible readings. Housing 12 is constructed from a nontoxic substance that is sufficiently rigid so that it can withstand insertion into body cavities, yet is not brittle that it might snap apart if it were inadvertently bit upon, for example. While glass is acceptable, a resinous plastic polymer that can be formed by injection molding is preferred, and since a portion of housing 12 must be transparent to light transmission, the acrylics are especially well suited.

In the preferred embodiment and more easily discernible by reference to FIGS. 1, 2 and 3, housing 12 comprises two essentially identical shells 27 and 28, that are joined together about their periphery along surface 36 by means of an adhesive or ultrasonic welding. Because the solvents used in some adhesives exert a vapor pressure sufficient for the vapor to dissolve in or migrate to the temperature responsive material 32, the use of ultrasonic welding is preferred.

About the periphery of each shell 27 and 28 is a recess 35 having shoulder 34 for supporting plaque 26. When the shells 27, 28 are sealingly engaged to one another along edge 36, plaque 26 rests at the juncture of the shells in the slot formed by the cooperation of recesses 35 and shoulders 34.

When shells 27, 28 are joined together, including plaque 26 supported therebetween, there is formed in housing 12, a hollow core 15. Core 15 is defined by ends 21, 23, the bottom wall 18 of each shell 27, 28 and the sidewalls 16, 17 which are formed by the juncture of the two shells about edge 36. Core 15 comprises three sections 22, 24 and 25. Section 22 extends from end 23 to lateral wall 19; section 24 from wall 19 to lateral wall 20; and section 25 from wall 20 to end 21. The hollow core 15 in sections 22, 24 is to conserve material and thereby provide a thermometer that is lighter in weight, yet sufficiently strong and flexible. Lateral walls 19, 20 being contiguous with shoulder 34 not only supply support for plaque 26, but also provide additional assurance of structural integrity during flexure to housing 12.

Sections 22 and 24 of core 15 occupy that part of thermometer 11 that serves as the handle during use. Section 25 is the operational section and will now be described.

Lateral walls 14 are also contiguous with shoulder 34, and together with wall 20, divide section 25 of core 15 into a plurality of cells 13 on either side of plaque 26.

Thus, the individual cell 13 is defined by lateral walls 14, bottom walls 18, sidewalls 16, 17 and plaque 26.

On the inner surface 31 of bottom wall 18 of each cell there is disposed a small quantity of a temperature-responsive material which will be more completely described later. On the surface of each side 29, 30 of plaque 26 there are imprinted indicia of temperature 38 (shown in FIG. 5) so they register with viewing windows 37. Window 37 comprises a magnifying lens and although the more suitable cylindrical planoconvex lens is preferred, other converging magnifying lenses including convex and spherical lenses are acceptable. The planoconvex cylindrical lens is preferred however because more uniform magnification of indicia 38 is obtained, and surface 31 is planar thus making disposition of material 32 on surface 31 a bit easier during fabrication. This is because material 32 is applied in the fluid state and on a flat surface it tends to remain where disposed to congeal rather than running. Referring to FIGS. 7 and 8, material 32 is applied to the central portion of surface 31. Only enough is applied to act as a shutter and obscure indicia 38. This amount occupies an area less than the entire area of surface 31. The advantage of this is that the formation of a meniscus during operation is obviated, and a faster response time is obtained. It is to be noted that neither hollow core 15, nor cell 13 is entirely filled with material 32, but only a layer is disposed on surface 31.

In the preferred embodiment shown in FIGS. 5 and 6, only that area of surface 31 is occupied by material 32 that is substantially equivalent to the area occupied by indicia 38 on surface 30 of plaque 26. This area occupied by material 32, as in the other embodiments, lies within the focal length of window 37, having point 40 as its focus.

So long as the ambient temperature is below that at which material 32 is designed to liquify, virtual image 39 cannot form. During operation, the proximal portion of thermometer 17 is inserted into a patient's mouth. If the patient's temperature exceeds the melting point of material 32 in cell 13, material 32 melts, spreads out as a thin film on surface 31 and the virtual image 41 in FIG. 6 is available for viewing.

In each of the cells 13, material 32 having a melting point corresponding to the indicia 38, melts if the ambient temperature exceeds the melting point of material 32. By having the melting points of material 32 in the cells serially graded by 0.5° F. for example, the highest indicia visible indicates the temperature of the patient.

The temperature-responsive material 32 can either be a pure material or a mixture of materials selected to have the desired eutectic point. There are many substances known in the art that have sharp melting points that immediately are suggested for use as a temperature-responsive material such for example as capric and lauric acid. Further examples are given in U.S. Pat. No. 3,002,385.

I claim:

1. A thermometer comprising at least one cell defined by a top wall, a bottom wall, and sidewalls; an indicia of temperature mounted on that surface of the top wall facing the interior of the cell; the bottom wall comprising a converging lens for viewing an enlarged upright virtual image of the indicia of temperature therethrough; a temperature-responsive material in the solid state not being transparent to light disposed on the surface of the bottom wall facing the interior of the cell, spaced apart from the indicia of temperature, and within the focal length of the lens; and during operation said material selected to melt at a predetermined temperature equal to or in excess of that indicated on on the indicia of temperature, and spread itself as a transparent film upon the surface of the bottom wall thereby exposing to view the virtual image of the indicia of temperature.

2. A thermometer according to claim 1 in which the area occupied by the solid temperature-responsive material is less than the area on the inner surface of the bottom wall, but greater than the area outlining the indicia of temperature.

3. A thermometer according to claim 1 in which said converging lens is cylindrical planoconvex.

4. A clinical thermometer for measuring body temperature comprising a body member having a distal end adapted for use as a handle when manipulating the thermometer, and a proximal end adapted for housing a temperature-responsive material, having a plurality of cells defined in the proximal end; each of said cells defined by a top wall, a bottom wall and surrounded by sidewalls; an indicia of temperature mounted on the interior of the top wall in register with and viewable through the bottom wall; a temperature-responsive material not transparent to light in the solid state mounted on the interior surface of the bottom wall of each cell and spaced apart from the indicia of temperature, said temperature-responsive material selected to become fluid and transparent at a temperature substantially equivalent to the temperature stated on the indicia of temperature; said bottom wall comprising a converging lens of a focal length such that a virtual image of the indicia of temperature is viewable through the lens when said temperature-responsive material is fluid.

5. A thermometer according to claim 4 in which said top wall comprises a plaque sealingly mounted between a pair of bottom walls; a plurality of cells serially defined along the longitudinal axis of said body member on either side of said plaque; and the bottom walls of said thermometer comprising a plurality of cylindrical planoconvex lenses each individual lens in register with a cell.